United States Patent [19]

Roza et al.

[11] 3,727,184

[45] Apr. 10, 1973

[54] POSITION DETECTOR FOR CHARACTERS

[75] Inventors: Engel Roza, Emmasingel, Eindhoven; Leendert Hendricus Wallast, Rijswijk, both of Netherlands

[73] Assignee: U.S. Philips Corporation, New York, N.Y.

[22] Filed: June 28, 1971

[21] Appl. No.: 157,161

[30] Foreign Application Priority Data

June 27, 1970 Netherlands ........................7009520

[52] U.S. Cl. ..........................................340/146.3 H
[51] Int. Cl. ..............................................G06k 9/04
[58] Field of Search ...............................340/146.3 H

[56] References Cited

UNITED STATES PATENTS

| | | | |
|---|---|---|---|
| 3,597,731 | 8/1971 | Reitboeck et al. | 340/146.3 H |
| 3,328,761 | 6/1967 | Yamamoto et al. | 340/146.3 Y |

*Primary Examiner*—Thomas A. Robinson
*Attorney*—Frank R. Trifari

[57] ABSTRACT

The position of characters is determined by means of a row of photosensitive elements defining a band of sectors, the band being displaceable in the transverse direction. The elements are combined to from groups, each consisting of an equal number of, for example, adjoining sub-rows of elements. The overall length of a group is equal to the character dimension along the row. The position of the character is determined by processing the added signal of a group.

8 Claims, 7 Drawing Figures

INVENTORS
ENGEL ROZA
LEENDERT H. WALLAST
BY Frank R. Trifari
AGENT

INVENTORS
ENGEL ROZA
LEENDERT H. WALLAST
BY [signature]
AGENT

POSITION DETECTOR FOR CHARACTERS

The invention relates to a position detector for detecting the position of characters on a surface, comprising at least one row of photosensitive elements, each element detecting the amount of light coming from an area situated opposite said element, said amount of light being dependent on the presence of a portion of a character in said area, the areas being arranged in a band and a device being provided for moving the band along the surface in a direction transverse to the row.

A device of this kind is known from the U.S. Pat. No. 3,587,047. This device comprises a scanner which measures the light signal from a surface by dividing a vertical scan into 32 periods. For each of the 32 periods the signal is converted into a binary black/white signal. A character is scanned in a number of scanning lines, the 32 periods always mutually corresponding in the vertical position. The signals of the 32 periods are added in the horizontal direction such that:

black + black = black black + white = black white + white = white.

Subsequently, the relative positions of scanning line and character are adjusted by a deciding device.

This device has a number of drawbacks. Due to the direct conversion of the light signal into a binary signal, information is lost: it may be, for example, that a grey character is neglected. In order to enable processing of the information in an analog form, the invention is characterized in that the photosensitive elements are grouped in at least three groups comprising an equal number of elements. Summing devices are provided in which the light signals of the groups of elements can be added separately and in an analog form. The results of the additions are supplied to a provided deciding device in which the position of the character is determined.

A position detector of this kind is used in a device for character recognition, in which the determination of the position prior to the actual recognition facilitates the latter. The row of photosensitive elements may be added to the character recognition device additionally, but it is alternatively possible to store the obtained information before the recognition in a store for a short period wherein the exact position is being determined from that information.

The position can be determined in various manners. In the above-mentioned U.S. Pat. No. 3,587,047 this is effected by determining the lower edge of the character. In the position detector according to the invention, more information is retained and, therefore the entire character is considered for determining the position. A further embodiment of the invention is therefore characterized in that the row of photosensitive elements is divided into sub-rows, each having a length D which is smaller than the minimum character dimension in the direction of the row, groups always being formed by an equal number of sub-rows.

An advantageous configuration according to the invention is characterized in that said groups consist of adjoining sub-rows up to a length which is equal to the character dimension in the direction of the row, consecutive groups being shifted over a distance D, with respect to each other. In this manner, there is at least one group which measures the light of the complete character.

As a complement to this embodiment, a further embodiment according to the invention is characterized in that each time the groups consist of two halves, each of said halves consisting of an equal number of adjoining sub-rows. The space between the halves are equal to the character dimension in the direction of the row.

The signal of the groups can be processed in different manners. A simple method is to take into account the signal of the entire transverse dimension of the character. To this end, a further embodiment according to the invention is characterized in that an adder is provided for each of said groups. In combination therewith, a further preferred embodiment according to the invention is characterized in that the adder signals are integrated across the entire dimension of the character in the direction transverse to the row. These operations can be performed in analog form. However, each adder is also capable of converting the signal into a black/white signal, after which this signal is integrated in analog form.

Following the integration, the decision as regards the position of the character has to be made. This can be effected simply according to the invention by providing a deciding device in which the values of the integrated signals are compared with at least one threshold value, so that the position of the character can be determined.

In the described method, the mean accuracy of the position determination can never be better than approximately ½D. In order to improve the accuracy, the handling of the signals of the power meters can be fully effected in an analog form. To this end a further embodiment according to the invention is characterized in that the outputs of the power meters are sampled in time, by means of a switching network. A filter is provided in which the sampled signal is filtered, after which the position of the character can be determined from the signal appearing at the filter output.

In order that the invention may be readily carried into effect, some embodiments thereof will now be described in detail, by way of example, with reference to the accompanying diagrammatic drawings; in which FIG. 1 is a diagrammatic view of some characters and of a row of elements which is displaceable with respect thereto;

Figure 1:
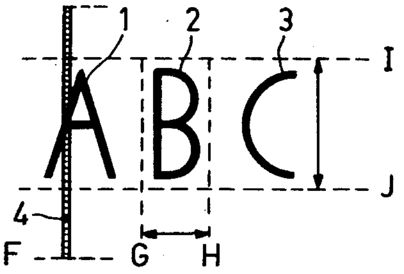

In FIG. 1 some characters (1, 2, 3) are shown. Prior to the commencement of scanning, a character height IJ is defined; this may be, for example, the mean character height. Furthermore, a character width GH is defined. During scanning, the row of photosensitive elements 4 having a length EF can be moved towards the right. In another embodiment each time a subsequent band of the surface is illuminated and is projected onto the elements. This may be done, for example, by means of a movable mirror. It is equally possible to use transmitted light. In that case, a light source is required behind the surface. Finally, either the characters or the surface itself may be luminescent.

Figure 2:
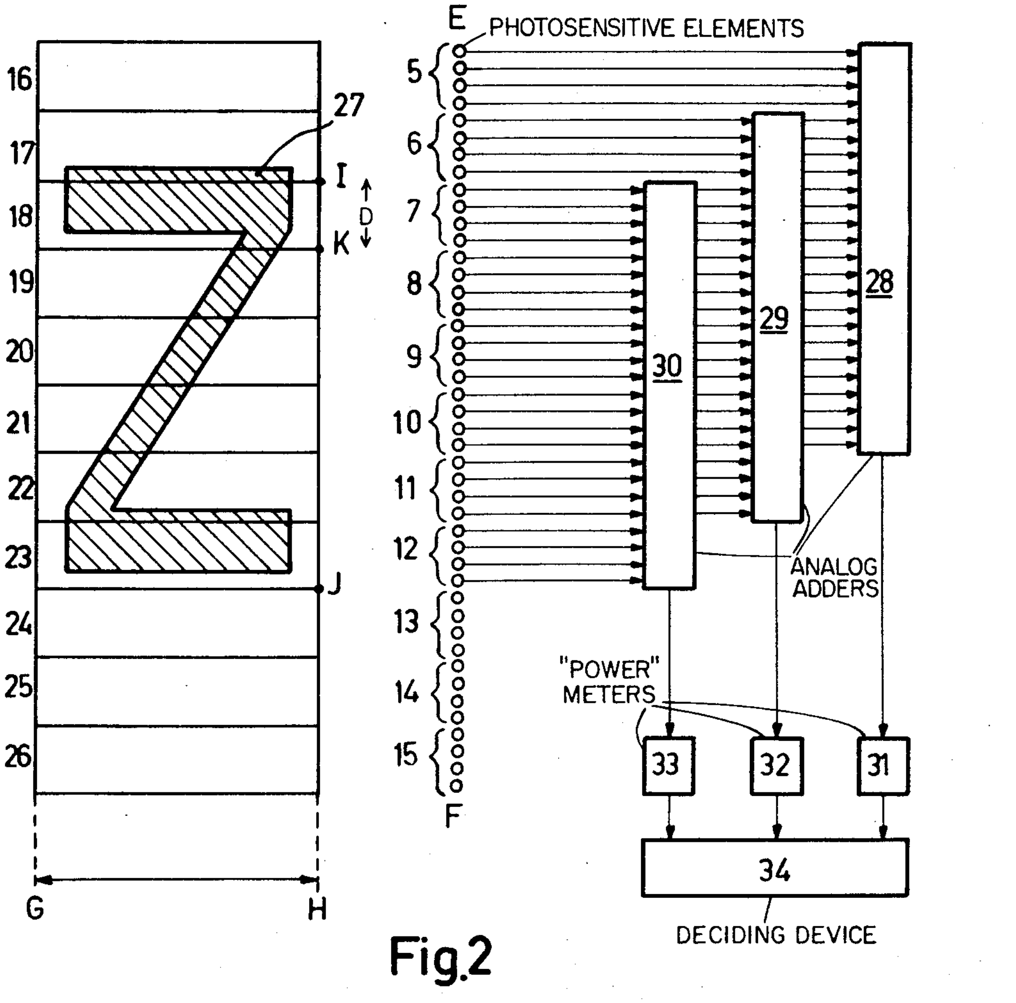
FIG. 2 shows the division of the photosensitive elements into sub-rows and the formation of the groups according to the invention.

In FIG. 2, the row of photosensitive elements has a length EF, the photosensitive elements being grouped in sub-rows of four elements each (5, 6, . . . 15) having a length D which is equal to the length of IK. The dimension of the characters transverse to the row is defined as GH. The areas covered by each sub-row are denoted by 16, 17, . . . 26. The signals of the sub-rows 5 to 10 are added in the adder 28 in analog form, those of the sub-rows 6 to 11 are added in the adder 29, and those of 7 to 12 are added in the adder 30. A group is thus defined which in this case consists of 24 photosensitive elements. The signals from the adders 28 to 30 are applied to the power meters 31 to 33, the output signals of which are applied to the inputs of the deciding device 34. For the sake of simplicity, the drawing shows only the formation of three groups of elements. In this case a group of elements has a length which is equal to IJ.

Figure 3:
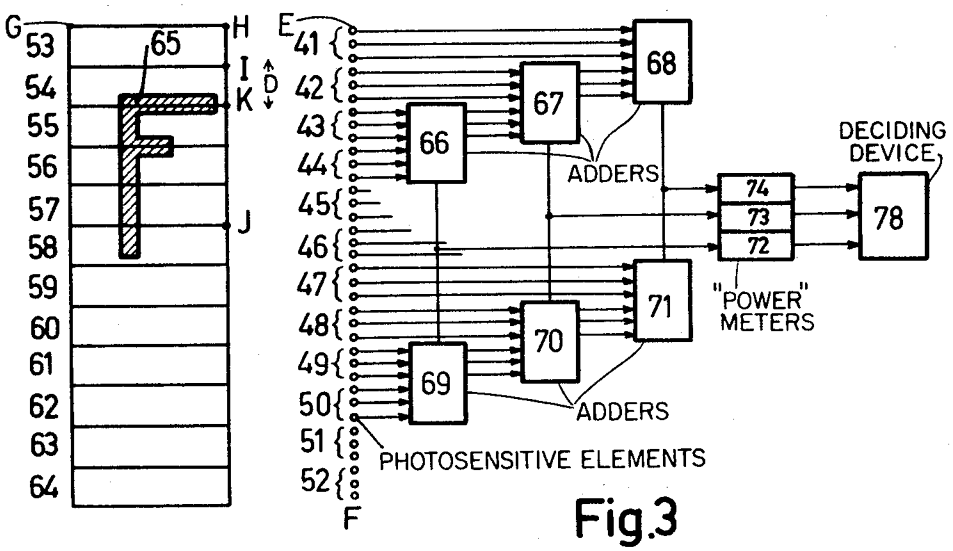
FIG. 3 shows the formation of the groups in accordance with another embodiment according to the invention.

FIG. 3 shows another embodiment according to the invention. The sub-rows are numbered 41 to 52, the surfaces covered by each sub-row are numbered 53 to 64, and the character to be detected is denoted by 65. In this case each sub-row consists of 3 photosensitive elements. The light signal of the sub-rows 41 and 42 is applied to the adder 68, that of the sub-rows 42 and 43 is applied to the adder 67, etc., as is shown. If desired, the adders may be combined in pairs to form one adder, i.e., 66 with 69, 67 with 70, and 68 with 71. The signals from said pairs of adders are applied to the power meters 72, 73 and 74, respectively. The outputs of the power meters are connected to the inputs of the deciding device 78. The configuration shown in FIG. 3 may be advantageous with respect to that of FIG. 2 if the position of consecutive characters differs only slightly. In such a case a few groups of elements will suffice, while the signals of sub-rows at the level of the middle of the character need not be used. The position detector is thus simplified.

Figure 4:
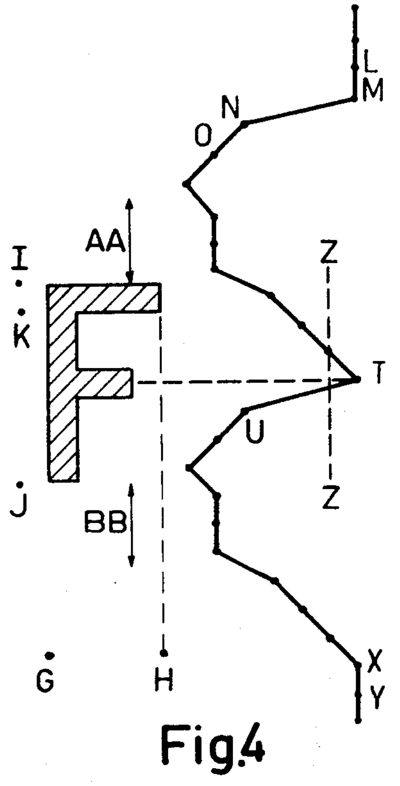
FIG. 4 shows the formation of an integrated light signal on the basis of which the position of the character is decided.

The deciding devices 34 and 78, respectively, determine the position of the character. The character illustrated in FIG. 4 is analyzed using the construction shown in FIG. 3. The signals from the adders are integrated in the power meters over the entire distance GH. The line through L and Y serves as the zero line, and the value of the integrated signals is plotted horizontally (points L, M, N, O, . . . . T, U, X, Y). The character height is IJ, the sub-rows have a length IK, and the groups of elements consist of halves, the lengths of which are denoted by the arrows AA and BB. The signal at T is produced when the group is exactly adjusted on the character: in such a case the position of the halves is also indicated by the arrows. If the position is shifted downwards, first the upper bar of the character is detected by the upper half of elements. As a result, the signal at U is generated. Upon further displacement an increasing portion of the character is detected, but after some time a decreasing portion is detected. When the upper half is in the position of the arrow BB, the signal in point X is generated. The signal in point T indicates the adjustment. This can be determined by means of a detector which detects the maximum value of the signal. On the other hand a threshold detector may alternatively be used, for example, having the threshold level denoted by ZZ. The middle can be determined from the portion exceeding the threshold.

Figure 5:
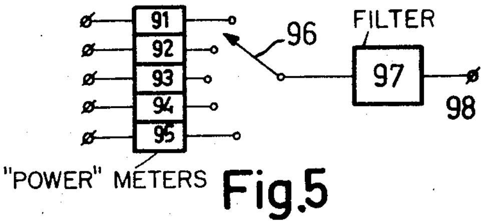
FIG. 5 shows a circuit arrangement for sampling the outputs of the power meters.
Figure 6:
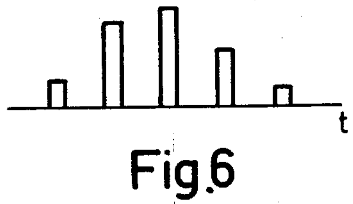
FIG. 6 shows an example of a resultant signal.
Figure 7:
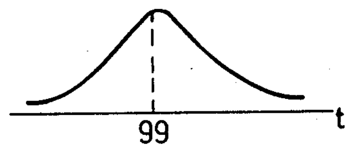
FIG. 7 shows the output signal of a filter on the basis of which the position of the character can be determined.

FIG. 5 shows another embodiment of the position detector according to the invention. The power meters 91, . . . 95 are provided with output terminals which are consecutively scanned by a switching network 96. An example of the signal received by the switching network is shown in FIG. 6, for which all the outputs of the power meters 91 . . . . 95 have been scanned exactly once. In this case, the time (t) is plotted along the horizontal axis and the signal of a character is assumed to be positive and is plotted vertically. Between the scanning of the outputs of two consecutive power meters, there is a time interval in which no signal is received. To enable the position of the character to be determined at any instant, the switching network 96 is connected in FIG. 5 to the input of a filter 97. This may be, for example, a lowpass filter. If the filter characteristic is properly chosen, the output signal of the filter as a response to the signal of FIG. 6 can be represented by FIG. 7. From the instant of the maximum (99) the middle of the character can again be determined, as the switch 96 is regularly connected to the successive power meters also. The maximum value 99 can occur because the signal of FIG. 7 is applied to a differentiating network. Subsequently, the zero-crossing of this differentiated signal is signalled. In this way the accuracy can be better than D, the length of the sub-rows. Optionally, in this case, a smaller number of sub-groups will suffice to obtain the same desired accuracy, so that a simplification is achieved.

In FIG. 4 the curve L, M, . . . Y has a very unsymmetrical shape, because the upper, horizontal element of the F has more influence than the lower vertical element. This can be improved by restricting the integral of the sub-row signal. Then between the photosensitive elements, and the adders, an integrator and a limiter must be provided. The latter interrupts if the integral of the signal surpasses a certain valve. Then, in FIG. 4, only the vertical line element of the F is considered.

By this position detection, a simple way of detection of the light signal, i.e. with analog adders and power meters, is combined with very accurate processing in a filter. Particularly through this filter it is possible to tolerate all sorts of faults such as stains and discolorations of the paper and poor printing quality of the letters, while proper position detection is maintained. Furthermore, the position of each individual character is determined, which may be of use, for example, in determining the position of characters printed by a line printer, as the position of these characters may always vary.

What is claimed is:

1. A position detector for detecting the position of characters on a surface, comprising at least one row of photosensitive elements, each element detecting the amount of light coming from an area situated opposite said element, said amount of light being dependent on the presence of a portion of a character in said area, the areas being arranged in a band and a device provided for relatively moving the band with respect to the surface in a direction transverse to the row, said photosensitive elements being grouped in at least three groups comprising an equal number of elements, summing devices being provided in which the light signals of the groups of elements can be added separately and in an analog form, and a deciding device for receiving the results of the additions and for determining the position of the character.

2. A position detector as claimed in claim 1, wherein the row of photosensitive elements is divided into sub-rows, respectively, each having a length which is smaller than the minimum character dimension along the row, said groups always being formed by an equal number of sub-rows.

3. A position detector as claimed in claim 2, wherein said groups consist of adjoining sub-rows, respectively, up to a length which is equal to the character dimension along the row, consecutive groups being shifted over a distance with respect to each other.

4. A position detector as claimed in claim 2, wherein the said groups each consist of two halves, each of said halves consisting of an equal number of adjoining sub-rows, respectively, a space between the halves being equal to the character dimension along the row.

5. A position detector as claimed in claim 3, wherein an adder is provided for each of said groups, respectively.

6. A position detector as claimed in claim 5, wherein the adder signals are integrated across the entire dimension of the character in a direction transverse to the row.

7. A position detector as claimed in claim 6, wherein a deciding device is provided in which the values of the integrated signals are compared with at least one threshold value, so that a position of the character can be determined.

8. A position detector as claimed in claim 5, wherein outputs of power meters are sampled in time by means of a switching network, a filter being provided in which the sampled signal is filtered, after which the position of the character can be determined from the signal appearing at an output of the filter.

* * * * *